United States Patent [19]

McNerney

[11] 4,032,214
[45] June 28, 1977

[54] CABLE-TERMINATION ASSEMBLIES AND METHODS FOR MANUFACTURING SUCH ASSEMBLIES

[75] Inventor: Richard P. McNerney, Houston, Tex.

[73] Assignee: Schlumberger Technology Corporation, New York, N.Y.

[22] Filed: Apr. 21, 1976

[21] Appl. No.: 678,814

[52] U.S. Cl. .............................. 339/218 M; 29/629; 339/102 R
[51] Int. Cl.² ........................................ H01R 13/50
[58] Field of Search ...... 339/102 R, 218 R, 218 M; 29/628, 629, 630 R, 630 A; 174/189, 196

[56] References Cited

UNITED STATES PATENTS

| 3,093,434 | 6/1963 | Francis | 339/218 R |
| 3,744,128 | 7/1973 | Fisher | 29/628 |
| 3,945,708 | 3/1976 | Griffin | 339/218 R |

FOREIGN PATENTS OR APPLICATIONS 292,278  7/1965  Netherlands ................... 339/218 R

OTHER PUBLICATIONS

Joy, "To Begin with . . . a Concept", Advertisement, Mar. 1960.

Primary Examiner—Roy Lake
Assistant Examiner—Mark S. Bicks
Attorney, Agent, or Firm—Ernest R. Archambeau, Jr.; William R. Sherman; Stewart F. Moore

[57] ABSTRACT

In the representative embodiments of the present invention disclosed herein, new and improved termination assemblies for multi-conductor electrical cables are manufactured by first molding a unitary fluid barrier around the cable conductors for integrally bonding or fusing this barrier around the conductor insulating sheaths so as to block fluid-leakage paths within the barrier and along the exterior of the conductor sheaths. The forward face of the barrier and the rear face of the contact support member of an electrical connector are also specially prepared so that as a selected thermosetting polymer, such as an unvulcanized elastomer, is subsequently molded to form a body individually surrounding each of the conductors extending ahead of the barrier, the now-vulcanized elastomer will be bonded to both the contact support member and the fluid barrier so to block fluid-leakage paths within the body and ahead of the fluid barrier which might otherwise intercommunicate the interiors of these sheaths.

68 Claims, 11 Drawing Figures

CABLE-TERMINATION ASSEMBLIES AND METHODS FOR MANUFACTURING SUCH ASSEMBLIES

Much effort has been devoted heretofore in providing electrical cables and connectors which are particularly suited for various underwater services. Such services make it essential, of course, that terminations for these cables be constructed in such a manner that water will be unable to contact any bare electrical conductor. With jacketed cables, on previous practice has ordinarily been to simply pass the cable or its insulated conductors through a conventional stuffing box on the connector body or some other type of sealing arrangement. It will be recognized, however, that the reliability of these and other mechanical sealing arrangements is no better than the physical integrity of the exposed parts of the cable or conductors. Thus, should a cable jacket leak, water can readily enter into the rear of the cable connector by way of the interstitial spaces between the cable conductors. Similarly, with so-called "flooded" cables such as typical armor-covered cables, water can easily pass into the cable termination by way of these spaces.

As depicted in a copending application, Ser. No. 550,270 filed Feb. 18, 1975, a unique process has been developed heretofore which is particularly directed toward blocking the leakage of water into the rear of the connector body around each of the several conductor sheaths. In brief, that new and improved process involves the moulding of an initially-unvulcanized elastomeric sleeve around the thermoplastic insulating sheath covering each conductor, with these materials being selectively matched so as to achieve bonding. Since that process was initially used to individually encapsulate each electrical conductor, it was, as a practical matter, ordinarily limited to making terminations for cables having no more than a few conductors. Otherwise, if more than about five or six conductors were involved, the combined bulk of those individual encapsulations was such that the resulting termination assembly was of a wholly-impractical size.

In preparing a termination assembly for a cable having a large number of conductors, that new and improved process was heretofore somewhat modified or extended in at least one commercial application by spatially positioning a pair of thermally-stable plastic spacer members along the conductors just beyond the cable covering. A hollow hold was then temporarily mounted around the spacers; and a molten thermoplastic introduced into the cavity encompassing the several paralleled or laterally-spaced conductors between the two spacers for moulding a single, unitary fluid barrier around all of the conductors with this barrier being integrally fused around their thermoplastic sheaths. After connecting the conductors to the electrical contacts or pins at the forward end of a tubular body or shell, the rear of the shell was filled with an epoxy or some other potting compound to support those portions of the conductors ahead of the fluid barrier and eliminate voids in the compound where condensation or water might otherwise occur. Using the techniques of the above-identified copending application, an integral body of an elastomer or thermoplastic was then molded and bonded around the outside of the connector shell and the perimeter of the fluid barrier for blocking leakage passages exterior of the barrier leading into the connector shell. Where the cable was jacketed, this elastomeric or thermoplastic body was also lengthened and bonded to a convenient point on the cable jacket for providing a completely fluid-tight termination assembly for the cable.

Experience has shown, however, that the above-described modified process (which is now prior-art with respect to the present invention) is effective only for blocking the minute, annular fluid-leakage paths that would otherwise exist around the conductor sheaths at those points where the conductors pass through the integral fluid barrier. Thus, should rough handling of the cable cause breakage of one or more of the cable conductors or insulating sheaths at some point well beyond such a prior-art termination assembly, water can readily migrate through the interior of a broken conductor sheath along the interstitial spaces between the conductor strands and pass on through the fluid barrier into the connector body. Once this occurs, those skilled in the art will appreciate that many, if not all, of the conductors will soon be electrically shorted. The direct costs for repairing such faulty cables and prior-art assemblies as well as the expenses incurred from the time lost in related or affected operations are, of course, ordinarily quite considerable.

Accordingly, it is an object of the present invention to provide new and improved manufacturing techniques and the products provided thereby which are particularly suited for terminating multi-conductor electrical cables having either a fluid-impervious jacket or some other covering such as one or more layers of armor so as to completely block all possible fluid-leakage paths into electrical connectors on a submerged end of such cables.

This and other objects of the present invention are attained in preparing new and improved fluid-tight terminations for covered multi-conductor cables by introducing a molten thermoplastic around the laterally-spaced end portions of the cable conductors for forming a unitary fluid barrier which is fused around each of the several conductor sheaths so as to block fluid-leakage paths within the barrier and exterior of the conductor sheaths. Thereafter, a body of a selected thermosetting polymer is bonded around each of the electrical terminals of the cable and to at least those surfaces on the front face of the fluid barrier surrounding each of the conductors so as to completely block intercommunicated fluid-leakage paths which would otherwise exist within the polymer body between the interior of adjacent conductor sheaths.

The novel features of the present invention are set forth with particularity in the appended claims. The invention, together with further objects and advantages thereof, may be best understood by way of the following description of exemplary apparatus and methods employing the principles of the invention as illustrated in the accompanying drawings, in which:

Figures 1, 2, 3:
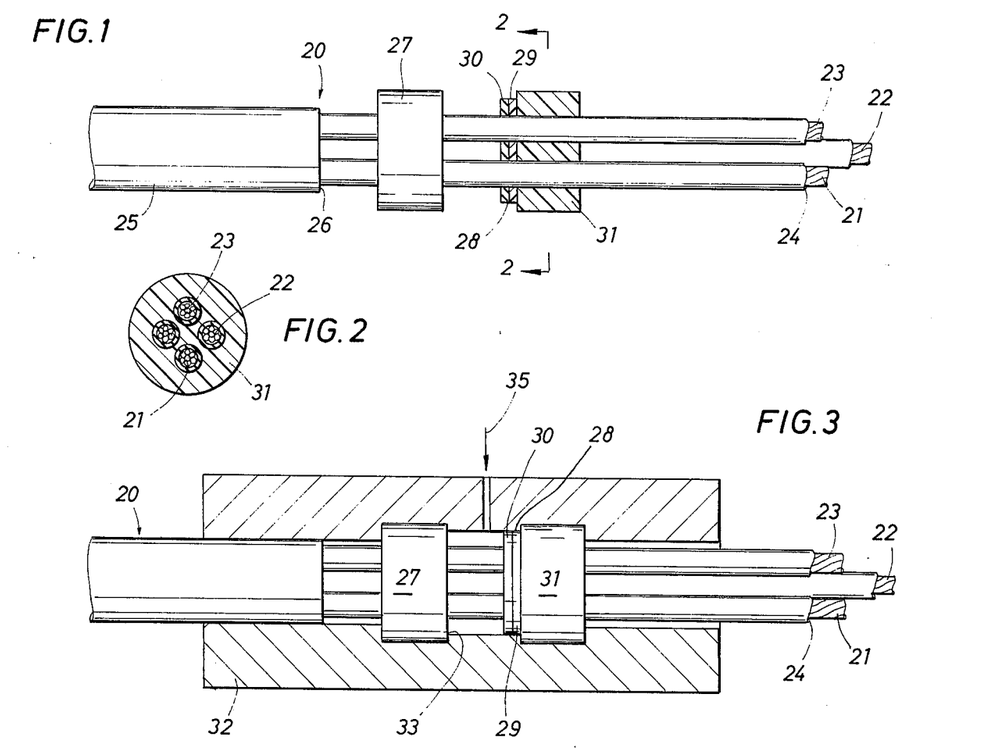
FIGS. 1 and 3–7 respectively illustrate the major steps of a preferred mode for practicing the new and improved methods of the present invention as those steps might be successively carried out with respect to a typical cable having a fluid-impervious jacket which is to be terminated with a connector having an external protective shell.
FIG. 2 depicts a representative embodiment of a thermally-stable conductor spacer typical of those that may be employed for producing the new and improved cable terminations of the present invention.

Turning now to FIG. 1, as indicated generally at 20, one end or terminal portion of a typical multi-conductor electrical cable is shown. As is common, the cable 20 is comprised of a number of electrical conductors, as at 21-23, which are respectively insulated by individual tubular sheaths, as at 24, of a typical thermoplastic material and collectively disposed within a closely-fitted sheath or tubular jacket 25 of a suitable thermoplastic or elastomeric material. The cable 20 may, of course, employ any conductor arrangement; and there may be as many as several hundred conductors which can alternatively either be of the same type and size, as shown at 21-23, be of different sizes, or even be of different types. As is customary, the several conductors 21-23 are preferably stranded to at least minimize breakage of the conductors caused by ordinary flexing of the cable 20. To prepare the cable 20 for the practice of the present invention, the fluid-impervious jacket has been previously removed from the end of the cable so as to uncover or expose the underlying portions of the several conductors 21-23 without disrupting or breaking those parts of their respective insulating sheaths, as at 24, located immediately adjacent to the circumferentially-cut end 26 of the cable jacket 25. Those skilled in the art will appreciate, of course, that the jacket 25 can be easily stripped or removed from the terminal portion of the cable in any conventional manner.

As best illustrated in FIGS. 1 and 2, after the unwanted end portions of the cable jacket 25 have been removed, the several conductors 21-23 are respectively passed through snugly-fitted holes in a spacer 27 which is formed of a selected thermally-stable material and has its holes arranged to generally correspond to the particular sizes and layout pattern of the cable conductors. The spacer 27 is preferably positioned as closely as is reasonably possible to the cut end 26 of the cable jacket 25.

Of particular significance to the present invention and in the preferred mode of its practice, a uniquely-arranged, generally-flat laminated member 28 also having holes corresponding to the layout pattern of the spacer 27 is snugly fitted over the several conductors 21-23 and positioned a short distance ahead of the spacer. As illustrated, it is preferred that the laminated member 28 be shaped and sized to conform to the shape and size of the spacer 27. More importantly, as depicted in FIG. 1, the laminated member 28 is provided with discrete forward and rearward layers 29 and 30 which are firmly bonded together by techniques such as described in the aforementioned pending application. As will subsequently be explained in greater detail, the layer 29 is formed of a selected elastomer and the layer 30 is formed of a thermoplastic or elastomer material.

A second plastic spacer 31 (which is at least similar, if not preferably identical, to the first conductor spacer 27) is then snugly fitted over the several conductors 21-23; and, in the preferred mode of practicing the invention, this second spacer is cooperatively positioned so that its rearward face is abutted or engaged flatly against the forward or elastomer layer 29 of the laminated member 28. If needed, those parts of the cable 20 and its several conductors 21-23 extending beyond the spacer 27 and 31 are either clamped or moderately tensioned as required for maintaining the paralleled parts of the cable conductors spanning the gap between the spacer members in a spaced relationship.

As will subsequently be described, the principal function of the end members or spacers 27 and 31 is to briefly confine a molten thermoplastic material until it solidifies or hardens. With insulating sheaths, as at 24, of typical thermoplastic materials having moderate melting temperatures, experience heretofore in manufacturing the previously-described prior-art termination assembly showed that the conductor spacers 27 and 31 are best formed of a thermally-stable plastic as polytetrafluoroethylene (e.g., Teflon) since that material has a relatively-low thermal conductivity and remains physically intact or mechanically stable even at temperatures in the order of 500° F. It is also of further benefit that the inherent lubricity of Teflon will facilitate the positioning of the snugly-fitting spacers 27 and 31 over the cable conductors 21-23.

Referring specially to FIG. 1, it will be recognized that once the two spacer members 27 and 31 and the unique laminated member 28 of the present invention are properly positioned over the several conductors 21-23 and those three members are appropriately retained in the depicted longitudinally-spaced relationship, the cable 20 is now in readiness for the formation of molding of an integral water-blocking barrier around the several conductors which will be bonded or fused to each insulating sheath as at 24. It will be appreciated, of course, that the specific shapes and sizes of the spacers 27 and 31 will dictate the particular configuration of any barrier which will be formed. However, as a matter of manufacturing convenience, it is ordinarily preferred to make the plastic spacers 27 and 31 circular with their diameter being commensurate with the number and size of the conductors 21-23 in the cable 20. As a matter of convenience, in practicing the present invention the laminated member 28 is also preferably circular and slightly smaller in diameter than the two conductor spacers 27 and 31, with its two layers 29 and 30 being of uniform thickness.

Accordingly, as schematically illustrated in FIG. 3, in the preferred practice of the invention a two-part, hollow mold 32 of a convenient design is mounted over the two spacer members 27 and 31 and positioned for defining a cylindrical cavity 33 between the opposed faces of the spacers which completely surrounds those laterally-spaced portions of the several cable conductors, as at 21-23, passing through the cavity. Those skilled in the art will recognize, of course, that any molding apparatus suitable for pressure injection or transfer molding of thermoplastics can be used to practice the present invention. For example, typical molding apparatus and techniques which can be employed include those generally described either in Chapters Four, Seven and Ten of *Plastics Engineering Handbook of the Plastics Industry*, (3d ed., Reinhold Publ. Corp., 1960) or in Chapters One through Three of Rubin, *Injection Molding Theory and Practice* (John Wiley & Sons, 1972).

In any event, the mold 32 itself preferably takes the form of an elongated, generally-cylindrical tubular member which is cooperatively sized and arranged to be complementally fitted over the two spacers 27 and 31 and firmly secured in position as required for pressure injection of a selected molten thermoplastic into the cavity 33. It will also be understood that typical procedures or customary safeguards (such as heat sinks or coolants) will ordinarily have to be provided as required for protecting those adjacent parts of the cable 20 immediately outside of the cavity 33 from being damaged by heat during the forthcoming molding operations.

The actual process conditions involved in injecting the selected thermoplastic will, of course, be wholly dependent upon whatever thermoplastic is used for the conductor sheaths, as at 24, as well as the specific thermoplastic which is to be injected. As might be expected, it is essential that the molten thermoplastic which will be injected is either identical to or selectively matched with the particular thermoplastic comprising the conductor-insulating sheaths, as at 24, and the thermoplastic layer 30 for effectively fusing these materials together. Ordinarily, the selection of the thermoplastic to be injected is best accomplished by simply using the same plastic that comprises the conductor sheaths, as at 24, and the laminate layer 30. On the other hand, there may be particular situations where these plastics could advantageously be closely-matched polymers such as polypropylenes and ethylene-propylene copolymers. Examples of various specific thermoplastics will be subsequently given.

Figure 4:
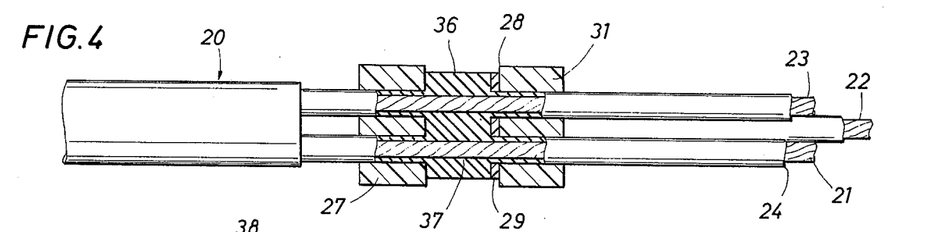

Accordingly, once a molten thermoplastic has been injected, as at 35, into the cavity 33, the plastic will soon sufficiently solidify or harden to permit removal of the mold 32. Then, as best illustrated in FIG. 4, it will be seen that the hardened thermoplastic will have formed a unitary water barrier 36 which is integrally formed around each of the several cable conductors, as at 21-23, and, as indicated at 37 for example, is fused around each of their respective insulating sheaths as at 24. The formation of the barrier 36 itself is, of course, entirely in keeping with the previous practice employed heretofore in manufacturing the prior-art termination assembly initially discussed. Of specific interest, however, with respect to the present invention it will be appreciated that in view of the arrangement of the unique laminated member 28, its thermoplastic layer 30 will now have disappeared by virtue of its being fused into the barrier 36 during the molding operation thereby resulting in the elastomer layer 29 now being uniquely bonded or fused onto the forward face of the newly-molded fluid barrier.

Although the newly-formed barrier 36 is sealingly bonded or integrally fused around each of the several thermoplastic sheaths, as at 24, respectively covering the cable conductors 21-23, it should be noted that the barrier is neither bonded or fused to either of the two Teflon spacers 27 and 31. Similarly, although the barrier 36 is fused as at 37 to each insulating sheath, as at 24, as was the case with the prior-art termination assembly previously described, neither of the two spacers 27 and 31 will be bonded or fused to the insulating sheaths around the several conductors as at 21-23. This complete lack of adherence of the spacers 27 and 31 to either the newly-formed barrier 36 or to the insulating sheaths, as at 24, is due, of course, to the nonsticking properties of the thermally-stable plastic (e.g., Teflon) used in constructing the spacers. Similarly, it will be understood that the elastomer layer 29 now uniquely bonded on the forward face of the fluid barrier 36 is also not stuck to the abutting face of the spacer 31.

Figure 5:
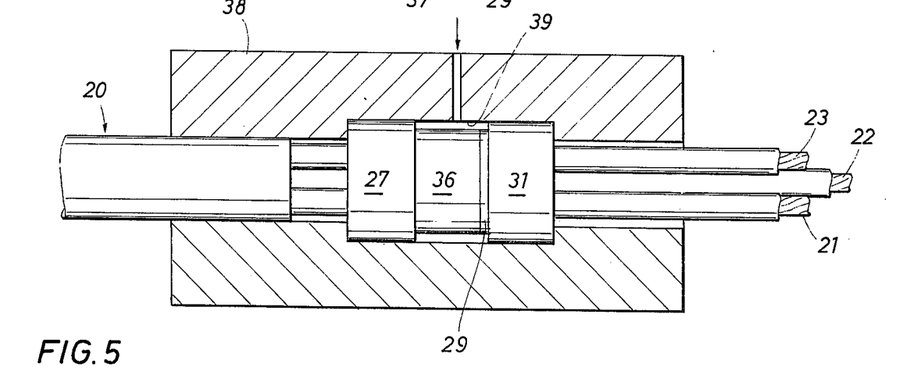
Figure 6:
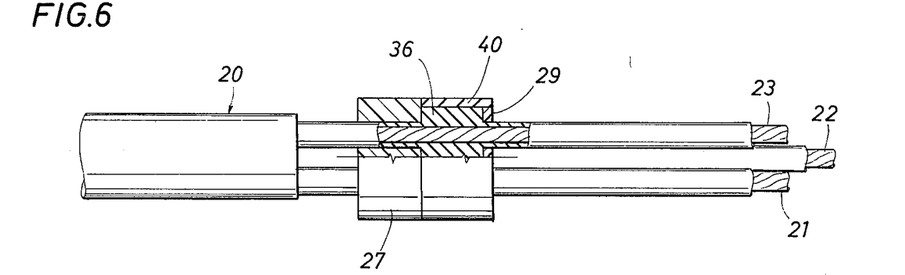

Once the newly-formed barrier 36 has sufficiently cooled, the mold 32 is removed and, if needed, any unwanted flashing or excess plastic is manually trimmed from the now-hardened fluid barrier so as to leave a smooth exterior. When this is accomplished, as schematically illustrated in FIG. 5 and as shown in FIG. 6 in the preferred practice of the invention, a two-part mold 38 sized and internally shaped, as at 39, for molding a generally-annular band 40 of a selected elastomer completely around the newly-molded thermoplastic barrier 36 is placed around the barrier and the two spacer members 27 and 31. Here again, although other conventional molding apparatus of suitable size and design can be successfully used, it is ordinarily, preferred to again employ the same molding apparatus (not shown) as used in forming the barrier 36 and the second mold 38 is, therefore, correspondingly arranged.

If the molded band 40 is to be provided it will be recognized that although various types of elastomers can be employed, the chosen elastomer must also be one which can be firmly bonded around the thermoplastic barrier 36. The axial length of the cavity 39 is, of course, arranged to be equal to the combined length of the barrier 36 and the thickness of the laminate 29 on its forward face. It should be noted in passing that the spacer members 27 and 31 will also be effective for again blocking the ends of the cavity when the elastomer band 40 is being molded. Hereagain, it will be understood that if it is to be provided, the molding of the elastomer band 40 is in keeping with the particular technique used to form the prior-art termination assembly described heretofore; and the principles set out in the aforementioned application (hereby incorporated by reference) are employed to assure integral bonding of the band to the barrier 36.

Once the annular band 40 is formed around the barrier 36 and (as illustrated in FIG. 6) the mold 38 has been removed, the outer or forward spacer 31 is then preferably removed by simply slipping it back off of the several cable conductors 21-23. It will be recognized, however, that the integrally-molded barrier 36 will prevent removal of the spacer 27 unless the spacer is first cut away. Removal of the rearward spacer 27 is, of course, rarely needed; and, preferably, its removal is ordinarily not even attempted so as to not risk damaging either the several conductors 21-23 or their respective insulating sheaths as at 24. In either case, the spacer 27 has served its purpose and is no longer of any utility.

Although this step may be omitted or other sequences may be employed, in the preferred mode for practicing the present invention it is ordinarily more convenient at this point in the manufacturing process to also block the fluid-leakage paths within the conductor sheaths 24 presented by the interstitial voids existing between the multiple stands of the several cable conductors 21-23. Moreover, inasmuch as the perimeter of the newly-formed fluid barrier 36 provides a stable or rigid surface, as a matter of operating convenience it is preferred to simply confine the loose ends of the conductors 21-23 in a container (not shown) and utilize the barrier itself as a closure member to sealingly close the mouth of the container by temporarily arranging a sealing member between the container and barrier. Then, by applying moderate fluid pressure to the interior of the container, a suitable fluent compound such as a low-viscosity elastomer or thermosetting elastomer contained in the container will be readily forced into and displaced along the respective sheaths, as at 24, of the several conductors 21-23 for a distance ordinarily of at least several feet beyond the confined end of the cable 20. In some instances, it may be preferred to precede this conductor-filling step by using a similar technique for injecting a solvent such as methyl ethyl ketone through the sheaths, as at 24, to thoroughly clean the strands of the conductors 21-23.

Figure 7:
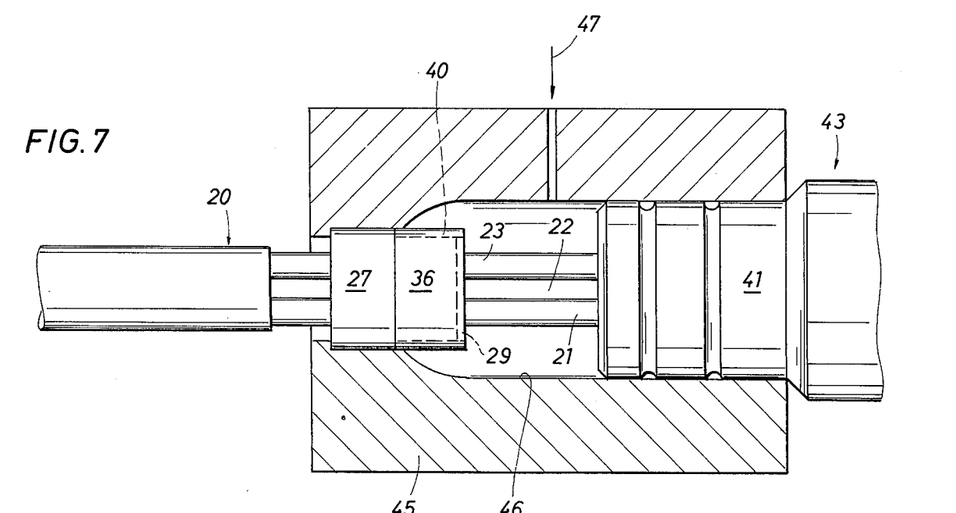
Figure 8:
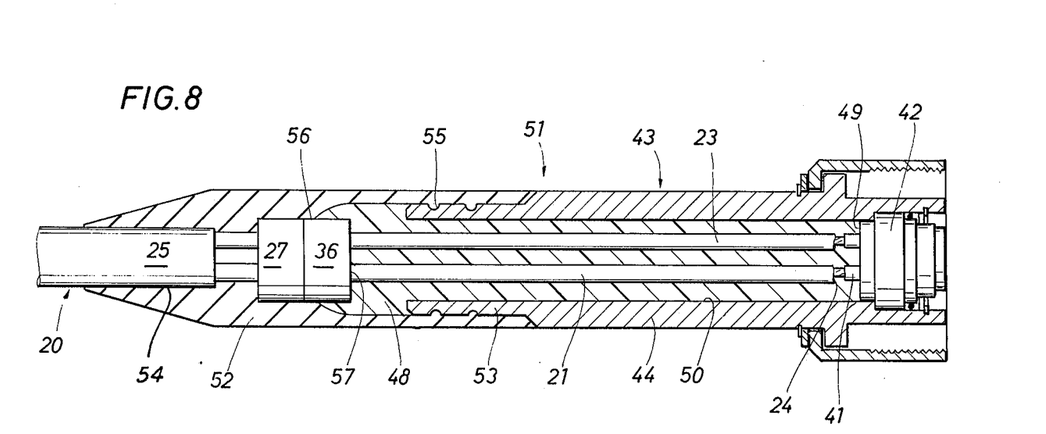
FIG. 8 shows a preferred embodiment of a new and improved termination assembly such as will be produced by practicing the method of the present invention as successively illustrated in FIGS. 1 and 3-7.

In either case, whether the end portions of the conductors 21-23 are filled or not, their exposed ends are then prepared as required and electrically connected to the contacts or terminal pins, as at 41, which in this situation are projecting from the back side of a typical insulating contact-support member 42 of a selected cable connector such as shown generally at 43 in FIGS. 7 and 8. It will, however, be understood that the exposed surfaces of at least the rear face of the contact-support member 42 and preferably the terminals 41 as well will have to be properly prepared or cleaned as required for subsequent bonding.

The particular arrangement of the cable connector 43 will, of course, depend upon the nature of the service involved, the specific configuration of the cable 20, and other things of no particular concern to the successful practice of the present invention. In any event, cable connectors, as at 43, often include a tubular, metal shell 44; and, to better equip the new and improved cable termination of the present invention, it is preferred that the fluid barrier 36 also be fluidly sealed in relation to this shell.

Accordingly, as schematically illustrated in FIG. 7, a third two-part mold 45 is cooperatively sized and arranged for being fitted around the new and improved termination assembly of the present invention as it is constituted following the electrical connection of contacts or terminals, as at 41, to the ends of the conductors 21-23 respectively. In the preferred practice of the invention, the mold 45 is arranged to define an enclosed, annular space or cavity 46 around the laterally-separated conductors 21-23 which begins at a selected peripheral location on the fluid barrier 36 and extends forwardly inside of the connector shell 44 to the rear face of the insulated contact support 42 mounted at the forward end of the shell. As illustrated at 47, a suitable thermosetting polymer, such as an elastomer, is injected into the mold 45 for completely filling the cavity 46 to the rear of the contact support member 42. As shown in FIG. 8, after the mold 45 has been removed, the connector body or shell 44 will have been entirely filled with a polymer body 48 having its rearward portion firmly bonded to the fluid barrier 36 by way of the elastomer laminate 29 and the elastomer band 40, and as shown at 49 having its forward portion bonded to the rear face of the contact support 42, and as shown at 50 having its mid portion bonded to the internal surfaces of the connector shell.

As was also the case with the prior-art termination assembly already discussed, where a connector, as at 43, is being utilized, it is ordinarily preferred that the new and improved termination assembly 51 of the present invention be completed by the formation of an outer, generally-cylindrical elastomer body 52 which, by virtue of the elastomer band 40, is integrally joined to the fluid barrier 36 as well as to the cable jacket 25 and a reduced portion 53 of the connector shell 44. Regardless of whether it is an armored cable, or some other type of flooded cable, or the jacketed cable 20, the extent to which the elastomer body 52 encompasses the cable covering, as at 25, will, of course, depend solely upon design considerations of little or no concern to the purposes of the present invention. Those skilled in the art will understand that a two-part mold (not shown) and molding apparatus such as previously discussed may be successfully employed for molding of the outer elastomer body 52 to complete the new and improved cable termination 51 of the present invention.

As was the case with the previously-discussed prior-art assembly, the practice of the new and improved methods of the present invention produces a superior cable termination assembly, as at 51, which is similarly arranged for reliably blocking the migration of water along various leakage paths exterior of the conductor sheaths 24 and between the exposed portions of the cable 20 and its associated terminal connectors as at 41. As best illustrated in FIG. 8, the bonded junctions, as at 54 and 55, cooperate to block the entrance of leakage fluids into the interior of the outer termination-assembly body 52; and the bonded junction, as at 56, of that body with the intermediately-located elastomer band 40 serves to effectively block migration of such unwanted fluids around the fluid barrier 36 within the interior of the outer body. In a similar fashion, as previously discussed with regard to FIG. 4, it is evident that the interfused junctions, as at 37, between the fluid barrier 36 and each of the several insulated conductor sheaths, as at 24, cooperate for blocking any leakage paths through the barrier and on into the connector body 44 that might otherwise exist exterior of the conductor sheaths. In any case, water cannot enter the connector body 44 exterior of the sheaths, as at 24, whether it is by way of a break at some remote location in the cable jacket 25 or it is a typical flooded cable having a similar termination assembly to that shown at 51.

Experience with prior-art termination assemblies (such as the one discussed in the introductory portion of the present specification) has shown, however, that the various fluid-leakage paths just described do not always represent the only way that water can enter a typical connector as at 51. For example, ordinary rough handling or common operational mishaps will often cause minor breaks in the jacket 25 at any point along the length of the cable 20 and, at the same time, frequently break one or more conductor sheaths, as at 24. Should this happen when the cable 20 is submerged at a considerable depth, those skilled in the art will appreciate that water entering a newly-broken conductor sheath, as at 24, could freely migrate along the length of the tubular sheath by way of the various interstitial spaces around the several strands in that conductor. Should that occur, if it were not for the present invention such migrating water would ultimately pass into the connector body, as at 44, and then quite possibly bridge two or more of the terminal pins, as at 41, in the contact insert 42 and electrically short out the corresponding conductors as at 21 and 22.

The new and improved termination assembly 51 of the present invention is, however, particularly effective in blocking intercommunication between fluid-leakage paths that would otherwise exist inside of any two or more of the conductor sheaths as at 24. Specifically, even if the end portions of the conductor sheaths, as at 24, were not filled with a filling compound as previously described, it should be noted that the new and improved methods of the present invention are particularly directed toward providing terminal assemblies, as at 51, which completely isolate the end portions of each of the several conductors 21-23 extending between the forward face of the fluid barrier 36 and the base or rear face of the insulated contact support 42 as well as their respective terminals as at 41.

For example, should there be a break in the cable jacket 25 and the sheath 24 around the conductor 21 at a remote point some distance away from the new and improved assembly 51, if the cable 20 and its termination assembly are submerged at a considerable depth the hydrostatic pressure of the surrounding water will immediately tend to cause the migration of water through the cable jacket toward the termination assembly. However, by virtue of bonded junctions, as at 49, which are so uniquely formed between the polymer body 48 and at least those surfaces on the rear face of the contact support 42 individually surrounding each of the terminals 41, water migrating within any given conductor sheath, as at 24, and emerging from its open end just behind its associated terminal, as at 41, will be reliably blocked from then moving laterally along the rear face of the contact-support member to any of the other similarly-isolated electrical terminals. As a further aspect of the present invention, should any of the aforedescribed migrating water then be forced back through the minute annular space immediately surrounding the sheath 24, the bonded junction, as at 57, between the elastomer body 48 and the laminate 29 on the fluid barrier 36 and individually surrounding each of the several laterally-separated conductors as at 21-23 will be similarly effective to halt further migration of water in a lateral direction along the forward face of the barrier. This latter junction 57 will, of course, serve to stop such leakage water from leaving the minute space surrounding one conductor sheath, as at 24, and entering the similar space around a nearby conductor sheath.

The preceding disclosure has been specifically directed to cables having fluid-impervious jackets (as at 25); and it is ordinarily preferred — if not essential as a matter of commercial application — for the termination assembly (as at 51) to effect a fluid seal with such jackets. As previously mentioned, however, there are situations where the cable is a so-called flooded cable and water will freely enter spaces surrounding the individual sheathed conductors. An armored cable such as shown in U.S. Pat. No. 3,800,066 is a typical flooded cable; and whether it is being used as an oilfield logging cable or as an armored control cable for a sub-sea device, it is apparent that no useful purpose would be gained by effecting a fluid-tight seal between its external cover or armor and a molded fluid-tight barrier (as at 36) around the cable conductors as produced by practicing the new and improved methods of the present invention. Thus, although it might be desirable in some cases to bond the external portion (as at 52) of its termination assembly to the outer armor or external covering of a flooded cable as a matter of convenience either to protect the cable conductors or to provide mechanical strengthening, such bonding would obviously be ineffective for blocking any fluid-leakage paths.

The new and improved termination assembly 51 as described by reference to FIGS. 1 and 3-8 is, of course, well equipped for marine service under even the severest environmental conditions. It should be recognized, however, that under less-severe operating conditions, there may well be situations where the additional protection provided by an external metal shell (as at 44) is unnecessary. Similarly, space or cost requirements may often make it desirable to eliminate such metal shells (as at 44) and outer polymer bodies (as at 52) and instead simply arrange the polymer body (as at 48) in such a manner that it will be an effective substitute for those eliminated elements.

Figure 9:
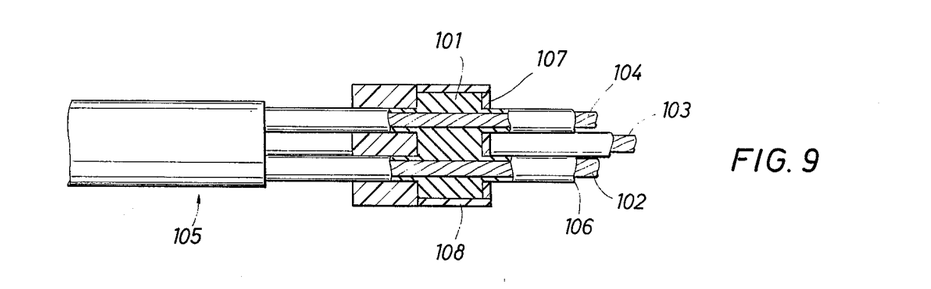
FIGS. 9 and 10 depict some of the more-significant steps of another method in accordance with the present invention for manufacturing an alternative embodiment of another new and improved termination assembly.
Figure 10:
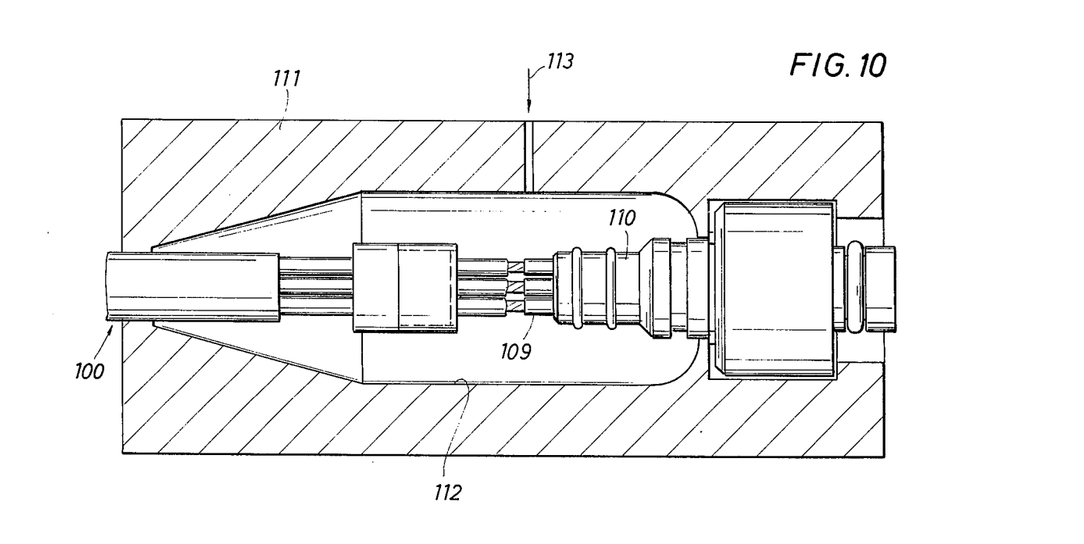
Figure 11:
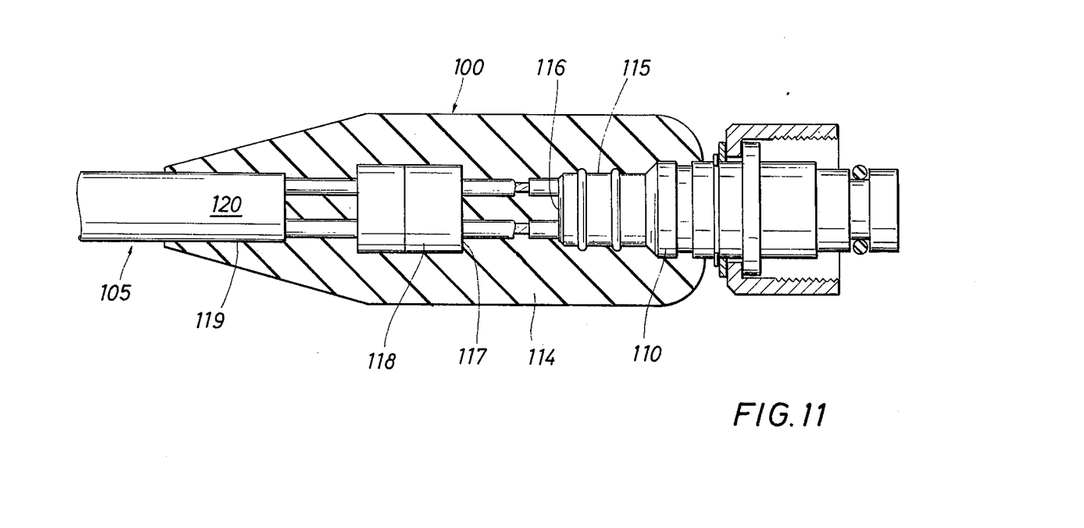
FIG. 11 shows the termination assembly produced by the method illustrated in FIGS. 9 and 10 and also incorporating the principles of the present invention.

Accordingly, as successively illustrated in FIGS. 9-11, new and improved methods similar to those previously described may be effectively employed for producing another termination assembly 100 also in keeping with the principles of the present invention. It will, of course, be appreciated that the initial preparation of the termination assembly 100 to bring it to the condition depicted in FIG. 9 will be best carried out by steps corresponding to those illustrated and previously discussed with regard to FIGS. 1 and 3-5. Using similar or identical techniques, a fluid barrier 101 will have been integrally molded around the conductors 102-104 of the cable 105 and individually fused to their respective sheaths as at 106; and an elastomer layer 107 and an elastomer band 108 will have been bonded to the forward face and perimeter of the barrier respectively. It should be noted that where the layer 107 and the band 108 are to be of the same elastomer, the laminated member could alternatively be cup-shaped so that these elastomers will be simultaneously bonded to the fluid barrier 101 as the barrier is molded. That alternative arrangement would, of course, eliminate a special molding step.

To complete the termination assembly 100, the several conductors 102-104 are electrically connected to their associated terminals or pins, as at 109, projecting from the rear of an insulated connector body 110. Then, a typical two-part mold 111 is temporarily mounted around the cable 105 and the connector body 111 for defining a cavity 112 of a selected size and configuration. Thereafter, a selected thermosetting polymer is injected, as at 113, into the cavity 112 for forming a molded body 114 which, as illustrated at 115-119, is firmly bonded or fused to the connector body 110, to the fluid barrier 101, and to the jacket 120 of the cable 105.

As was the case with the termination assembly 51, the bonded or fused junctions, as at 115 and 118, will be effective for blocking all fluid-leakage paths exterior of the connector body 110 and the fluid barrier 101. Similarly, it is of particular significance in the present invention to note that the bonded or fused junctions 116 and 117 are uniquely effective for blocking any lateral fluid-leakage paths along which water could contact two or more electrical terminals, as at 109, should such water enter a conductor sheath, as at 106, and exit from its open end adjacent to the body 110. Hereagain, as was the case with the termination assembly 51, the new and improved termination assembly 100 is also better equipped for the severe service by having its several laterally-separated conductor sheaths, as at 106, containing a suitable conductor-filling compound to provide an additional or redundant structure for blocking water migration through the conductor sheaths.

It should of course, be appreciated that many different polymers can be effectively employed in the practice of the present invention; and that the choice of these materials will, therefore, determine the specific molding techniques and the particular operating, processing and curing conditions. Thus, those skilled in the art will understand that, as always, the technical data as commonly supplied by the manufacturers of the various polymers or compounds to be employed must be consulted for specific details.

By way of example, considering what is presently available on a commercial basis, typical materials that can be advantageously employed in practicing the invention might be as follows:

TABLE I

A. Conductor insulation sheaths (as at 24 or 106)
   Ethylene-Propylene Copolymers
   Polyethylenes
   Polyvinyl Chlorides
B. Cable jackets (as at 25 or 120)
   Chloroprenes
   Ethylene-Propylene-Diene Monomers
   Ethylene-Propylene Rubbers
   Polyethylenes
   Polyurethanes
C. Laminated member (as at 28 or partly at 107)
   Ethylene-Propylene-Diene Monomers (as at 29 or 107) and
   Ethylene-Propylene Copolymers (as at 30)
   Ethylene-Propylene-Diene Monomers (as at 29 or 107) and
   Polyethylenes (as at 30)
   Chloroprenes (as at 29 or 107) and
   Polyvinyl Chlorides (as at 30)
D. Molded barriers (as at 36 or 101)
   Ethylene-Propylene Copolymers
   Polyethylenes
   Polyvinyl Chlorides
E. Elastomer bands (as at 40 or 108)
   Chloroprenes
   Ethylene-Propylene-Diene Monomers
   Ethylene-Propylene Rubbers
F. Conductor-filling compounds
   Polyurethanes
   Silicones
   Low-Viscosity Elastomers
G. Contact-support member (as at 42 or 110)
   Epoxies
   Nylons
   Phenolics
   Other Reinforced or Non-Reinforced Plastics
H. Connector shells (as at 44)
   Aluminums
   Brasses
   Coppers
   Reinforced and Non-Reinforced Plastics (e.g., Epoxies or Nylons)
   Stainless Steels
   Steels
I. Polymer bodies (as at 48 or 114)
   Chlorophenes
   Chlorosulfonated Polyethylenes
   Epoxies
   Ethylene-Propylene-Diene Monomers
   Nitriles
   Polyurethanes
J. Termination-assembly bodies (as at 52)
   Chloroprenes
   Chlorosulfonated Polyethylenes
   Ethylene-Propylene-Diene Monomers
   Ethylene-Propylene Rubbers
   Nitriles
   Polyurethanes The listing above in Table I of polyethylene as one possible material for the cable jacket 25 should be conditioned by noting that an additional or preliminary molding step not discussed above or needed with other jacket materials would be required. In particular, with a polyethylene cable jacket 25, it would ordinarily be necessary to initially mold a band of some compatible elastomer such as an ethylene-propylene-diene monomer around the jacket at some convenient location close to the cut end 26 of the jacket. Thereafter, the molding of the outer body 52 from an ethylene-propylene-diene monomer can be readily carried out as already described, with this band (not shown) around the jacket 25 serving as the particular means for attachment of the outer body to the jacket.

It is, of course, also expected that each particular cable-termination assembly, as at 51 or 100, will be designed in accordance with its anticipated service as well as with the particular materials (such as those shown in Table I) involved. For example, for purposes of maintaining its fluid-tight integrity, the overall length of the molded barrier (as at 36 or 101) must be sized to take into account the most severe pressure and temperature conditions under which the termination assembly, as at 51 or 100, must operate as well as the physical properties of the thermoplastic from which the barrier is molded. Other environmental conditions must, of course, be considered.

Although there are many permutative combinations of the several materials listed in Table I above, it has been found that, for most applications, three preferred embodiments will ordinarily suffice for most service conditions. These are as follows:

TABLE II

| | Assembly A | Assembly B | Assembly C |
|---|---|---|---|
| Conductor Sheath (24 or 106) | Ethylene-Propylene Copolymers (1) | Polyethylenes (2) | Ethylene-Propylene Copolymers (1) |
| Cable Jacket (25 or 120) | Chloroprenes (3) | Polyurethanes (4) | Polyurethanes (4) |
| Laminated Member (as at 28 or partly at 107) | Ethylene-Propylene Copolymers/ Ethylene-Propylene-Diene Monomers (1)(5) | Polyethylene/ Ethylene-Propylene-Diene Monomers (2)(5) | Ethylene-Propylene Copolymers/ Ethylene-Propylene-Diene Monomers (1)(5) |
| Molded Barrier (36 or 101) | Ethylene-Propylene Copolymers (1) | Polyethylenes (2) | Ethylene-Propylene Copolymers (1) |
| Elastomer Band (40 or 108) | Ethylene-Propylene-Diene Monomers (5) | Ethylene-Propylene-Diene Monomers (5) | Ethylene-Propylene-Diene Monomers (5) |
| Conductor Filling Compound | Low-Viscosity Silicone (6) | Low-Viscosity Silicone (6) | Low-Viscosity Silicone (6) |
| Contact Support Body (42 or 110) | Reinforced Epoxies (7) | Reinforced Epoxies (7) | Reinforced Epoxies (7) |
| Connector | Stainless | Brasses | Reinforced |

TABLE II-continued

|  | Assembly A | Assembly B | Assembly C |
| --- | --- | --- | --- |
| Shell (44) | Steels (7) | (7) | Epoxies (7) |
| Polymer Body (48 or 114) | Chlorosulfonated Polyethylenes (8) | Chloroprenes (3) | Chlorosulfonated Polyethylenes (8) |
| Termination Body (52) | Chloroprenes (3) | Polyurethanes (9) | Polyurethanes (9) |

(1) Hercules Powder Co. has provided a multi-page bulletin (apparently published in February, 1959) entitled "Injection Molding Pro-Fax" (No. 505) describing material characteristics and injection techniques for such materials.
(2) Hercules Powder Co. has published two undated bulletins designated as "Hi-Fax No. 3" (three pages) and "Hi-Fax No. 21" (two pages) that respectively deal with the injection molding techniques and detailed properties of typical polyethylenes.
(3) "Injection Molding of DuPont Elastomers" Bulletin WAJF Dec. 1964, describes typical processing and molding techniques for various chloroprenes.
(4) The Upjohn Company's multi-page bulletin "Processing Information for Urethane Elastoplastic Compounds" gives typical instructions for processing of polyurethanes which may be employed with the present invention.
(5) Dupont's "Processing of Nordel Hydrocarbon Rubber", Bulletin No. 3 (1966), is one of a series of DuPont bulletins dealing with the processing of ethylene-propylene-diene monomers as well as typical molding and curing procedures for achieving desired properties or physical characteristics. (See also Reference 3).
(6) Dow Corning "New Product Information" bulletin on Dow Corning XF-13-523 Dielectric Gel (May, 1968) and Stauffer Chemical Co. "Product Information" bulletin on RTV Silicone Gel V-120 (June, 1972) respectively describe suitable conductor-filling compounds.
(7) Hughson Chemicals Bulletin No. 2027C."Elastomer Bonding Guide " (1973) outlines typical surface preparations and application procedures recommended for bonding thermoplastics and elastomers to various metals such as may be commonly used for electrical connector bodies or shells as well as reinforced epoxies often used for such bodies or contact-support members.
(8) DuPont's Report No. 59-2 "Hypalon 40" (June, 1959) gives the processing information required for excellent elastomers such as Hypalon 40 and Hypalon 45 that can be effectively employed either for filling the connector shell 44 or for the outer body of a connctor assembly as shown in FIG. 11.
(9) Product Research Corp. Data Sheet PRC 1547 (March, 1970) describes typical moldable or castable polyurethanes which may be used for termination bodies.

Accordingly, it will be appreciated that the present invention is particularly directed toward providing fluid-tight cable termination assemblies which are uniquely arranged for blocking leakage paths into a cable connector that otherwise might exist through the narrow annular space lying around and within the respective insulating sheaths of the cable conductors. As described in detail above, these several leakage paths are effectively blocked by the first molding a single handened thermoplastic fluid barrier around the several conductors and integrally fusing that barrier to their respective sheaths for blocking off any leakage paths that might otherwise exist around each of the conductor sheaths. Preferably simultaneously, an elastomer is seaingly bonded to the forward face of the barrier surrounding each conductor. Thereafter, leakage paths exterior of the newlymolded barrier and within the conductor sheaths are also uniquely blocked by molding an integral polymer body around the barrier and bonding or fusing that molded body to at least the forward face of the barrier as well as to a typical contact-support member. In the preferred embodiments of the present invention, where the cable is jacketed, this molded body is also sealingly bonded to the jacket as well.

While only particular embodiments of the present invention and modes of practicing the invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A method for terminating an electrical cable having miltiple conductors respectively enclosed within thermoplastic sheaths collectively arranged within a cable covering and with laterally-separated end portions protruding therefrom comprising the steps of:

introducing a molten thermoplastic around said separated end portions for integrally fusing a unitary fluid barrier around each of said thermoplastic sheaths to block potential leakage paths through said fluid barrier and exterior of said thermoplastic sheaths;

arranging electrical terminals respectively on each of said end portions; and thereafter sealingly bonding a moldable polymer body around each of said electrical terminals respectively and to at least those surfaces on the forward face of said fluid barrier respectively encircling each of said end portions passing therethrough for blocking other potential leakage paths within said polymer body which are ahead of said fluid barrier and would otherwise intercommunicate the interiors of two or more of said thermoplastic sheaths.

2. The method of claim 1 further including the step of:

bonding said polymer body around and to said cable covering for protecting said end portions between said cable covering and the rearward face of said fluid barrier.

3. The method of claim 1 further including the step of:

sealingly bonding said polymer body around and to the perimeter of said fluid barrier for further blocking potential leakage paths within said polymer body exterior of said fluid barrier and otherwise in communication with the exterior of said polymer body.

4. The method of claim 1 wherein said thermoplastics are respectively selected from the group consisting of ethylene-propylene copolymers, polyethylenes, and polyvinyl chlorides.

5. The method of claim 4 wherein said thermoplastic for said insulating sheaths is dissimilar from said thermoplastic for said fluid barrier.

6. The method of claim 1 wherein said polymer body is molded from a polymer selected from the group consisting of chloroprenes, chlorosulfonated polyethylenes, epoxies, ethylene-propylene-diene monomers, nitriles, and polyurethanes.

7. The method of claim 1 further including the step of: introducing a fluent elastomer into said thermoplastic sheaths for blocking potential leakage paths within said thermoplastic sheaths.

8. The method of claim 1 wherein said electrical terminals are spatially mounted on a contact-support member of an electrically-nonconductive material; and further including the step of:

sealingly bonding said polymer body to at least those surfaces on the rearward face of said contact-support member respectively encircling each of said electrical terminals for further blocking said other potential leakage paths.

9. The method of claim 8 further including the step of:

bonding said polymer body around and to said cable covering for protecting said end portions between said cable covering and the rearward face of said fluid barrier.

10. The method of claim 9 further including the step of:

sealingly bonding said polymer body around and to the perimeter of said fluid barrier for blocking potential leakage paths within said polymer body exterior of said fluid barrier and otherwise in communication with the exterior of said polymer body.

11. The method of claim 8 wherein said contact-support member is supported within a tubular shell enclosing at least a portion of said polymer body; and further including the step of:

sealingly bonding another moldable polymer body around exterior portions of said tubular shell and to said fluid barrier for blocking additional potential leakage paths within said other polymer body exterior of said fluid barrier and said thermoplastic sheaths.

12. The method of claim 11 further including the step of:

bonding said other polymer body around and to said cable covering for protecting said end portions between said cable covering and the rearward face of said fluid barrier.

13. A method for terminating a multi-conductor electrical cable having its electrical conductors respectively enclosed within thermoplastic insulating sheaths and collectively arranged within a cable covering with their end portions protruding forwardly therefrom comprising the steps of:

passing said protruding conductor end portions through a corresponding number of aligned openings respectively located in longitudinally-spaced forward and rearward thermally-stable spacers cooperatively arranged for laterally separating said conductor end portions spanned therebetween as well as passing said conductor end portions through a corresponding number of aligned openings in a laminated member having a first layer of a thermosetting polymer adjacent to the rear of said forward spacer and a second layer of a thermoplastic complementally fitted and bonded to the rear of said polymer layer;

positioning a hollow mold around said spacers defining an enclosed cavity surrounding said separated conductor end portions and said laminated member and injecting a molten thermoplastic into said enclosed cavity at a temperture no lower than the fusion temperatures of said thermoplastics for molding a unitary fluid barrier encompassing said separated conductor end portions which is integrally fused around each of said insulating sheaths to block potential leakage paths through said fluid barrier and exterior of said insulating sheaths and also is integrally fused to said thermoplastic layer to bond said polymer layer on the front of said fluid barrier;

arranging electrical terminals on each of said conductor end portions; and thereafter sealingly bonding a body of a moldable polymer entirely around each of said electrical terminals and to at least those surfaces on said polymer layer respectively encircling each of said conductor end portions for cooperatively blocking other potential leakage paths within said polymer body which are exterior of said fluid barrier and would otherwise intercommunicate the interiors of two or more of said thermoplastic sheaths.

14. The method of claim 13 wherein said spacers are equal-sized cylinders; and said layers on said laminated member are flat discs with a diameter about equal to that of said spacers.

15. The method of claim 13 further including the step of:

bonding said polymer body around and to said cable covering for protecting said end portions between said cable covering and the rearward face of said fluid barrier.

16. The method of claim 13 further including the step of:

sealingly bonding said polymer body around and to the perimeter of said fluid barrier for further blocking potential leakage paths within said polymer body exterior of said fluid barrier and otherwise in communication with the exterior of said polymer body.

17. The method of claim 13 wherein said thermoplastics are respectively selected from the group consisting of ethylene-propylene copolymers, polyethylenes, and polyvinyl chlorides.

18. The method of claim 13 wherein said polymers are respectively selected from the group consisting of chloroprenes, chlorosulfonated polyethylenes, epoxies, ethylene-propylene-diene monomers, nitriles, and polyurethanes.

19. The method of claim 13 further including the step of:

introducing a fluent elastomer into said thermoplastic sheaths for blocking potential leakage paths within said thermoplastic sheaths.

20. The methods of claim 13 wherein said electrical terminals are spatially mounted on a contract-support member of an electrically-nonconductive material; and further including the step of:

sealingly bonding said polymer body to at least those surfaces on the rearward face of said contact-support member respectively encircling each of said electrical terminals for further blocking said other potential leakage paths.

21. The method of claim 20 further including the step of:

bonding said polymer body around and to said cable covering for protecting said end portions between said cable covering and the rearward face of said fluid barrier.

22. The method of claim 21 further including the step of:

sealingly bonding said polymer body around and to the perimeter of said fluid barrier for blocking potential leakage paths within said polymer body exterior of said fluid barrier and otherwise in communication with the exterior of said polymer body.

23. The method of claim 13 wherein said contact-support member is supported within a tubular shell enclosing at least a portion of said polymer body and further including the step of:

sealingly bonding another polymer body around exterior portions of said tubular shell and to the perimeter of said fluid barrier for blocking additional potential leakage paths within said other polymer body exterior of said fluid barrier and said thermoplastic sheaths.

24. The method of claim 23 further including the step of:

bonding said other polymer body around and to said cable covering for protecting said end portions between said cable covering and the rearward face of said fluid barrier.

25. A method for terminating a multi-conductor electrical cable having a plurality of conductors respectively enclosed within thermoplastic insulating sheaths and collectively arranged within a common cable covering with their end portions protruding forwardly therefrom comprising the steps of:
passing said protruding end portions through corresponding openings respectively located in forward and rearward spacers constructed of a thermally-stable plastic and cooperatively arranged for laterally separating said conductor end portions spanned between the opposed faces of said spacers and also passing said conductor end portions through corresponding aligned openings in a laminated member having a forward laminate layer of a thermosetting polymer positioned against the rearward face of said forward spacer and a rearward laminate layer of a thermoplastic bonded to said polymer layer;
positioning a first hollow mold around said spacers for defining a first enclosed cavity surrounding said laterally-separated conductor end portions and said laminated member;
injecting a molten thermoplastic into said first cavity at a temperature no lower than the fusion temperatures of said thermoplastics for molding a unitary fluid barrier around all of said separated conductor end portions and integrally fused to each of said insulating sheaths to block potential leakage paths through said fluid barrier and exterior of said insulating sheaths and also for integrally fusing said thermoplastic layer into said fluid barrier so as to bond said polymer layer to the forward face of said fluid barrier;
arranging a multi-terminal electrical connector having an insulated member supporting each of the terminals thereof on said conductor end portions ahead of said fluid barrier;
positioning a second hollow mold on said fluid barrier and said connector for defining a second enclosed cavity between said fluid barrier and said insulated terminal-supporting member of said electrical connector; and
injecting a moldable polymer into said second cavity for forming a unitary polymer body around said fluid barrier and said electrical connector which is sealingly bonded to at least those surfaces on said polymer layer and on said terminal-support member respectively encircling each of said conductor end portions to block potential fluid leakage paths within said unitary polymer body which are exterior of said fluid barrier and would otherwise intercommunicate the interiors of two or more of said insulating sheaths.

26. The method of claim 25 wherein said second cavity is also defined around the end portion of said cable covering so that upon injection of said moldable polymer into said second cavity, said unitary polymer body will also be formed around and bonded to said end portion of said cable covering for protecting said conductor end portions between said cable covering and the rearward face of said fluid barrier.

27. The method of claim 26 further including the step of:
sealingly bonding said unitary polymer body around and to the perimeter of said fluid barrier for further blocking potential leakage paths within said unitary polymer body exterior of said fluid barrier and otherwise in communication with the exterior of said cable jacket.

28. The method of claim 25 wherein said thermoplastics are respectively selected from the group consisting of ethylenepropylene copolymers, polyethylenes, and polyvinyl chlorides.

29. The method of claim 25 wherein said polymers are respectively selected from the group consisting of chloroprenes, chlorosulfonated polyethylenes, epoxies, ethylene-propylene-diene monomers, nitriles, and polyurethanes.

30. The method of claim 25 further including the step of:
introducing a fluent elastomer into said thermoplastic sheaths for blocking potential leakage paths within said thermoplastic sheaths.

31. The method of claim 30 wherein said second hollow mold extends around the end portion of said cable covering so that upon injection of said moldable polymer into said second cavity said unitary polymer body will also be bonded around and to said cable covering for protecting said conductor end portions between said cable covering and the rearward face of said fluid barrier.

32. The method of claim 31 further including the step of:
sealingly bonding said unitary polymer body around and to the perimeter of said fluid barrier for blocking potential leakage paths within said unitary polymer body exterior of said fluid barrier and otherwise in communication with the exterior of said unitary polymer body.

33. The method of claim 25 wherein said terminal supporting member of said electrical connector is supported within a tubular shell enclosing at least a portion of said unitary polymer body and further including the step of:
sealingly bonding another polymer body around exterior portions of said tubular shell and said fluid barrier for cooperatively blocking additional potential leakage paths within said other polymer body exterior of said fluid barrier and said thermoplastic sheaths.

34. The method of claim 25 wherein said terminal-supporting member of said electrical connector is supported within a tubular shell enclosing at least a portion of said unitary polymer body and further including the step of:
sealingly bonding another polymer body around exterior portions of said tubular shell, said fluid barrier, and said cable covering for cooperatively blocking additional potential leakage paths within said other polymer body exterior of said fluid barrier and said thermoplastic sheaths and for protecting said conductor end portions between said cable covering and the rearward face of said fluid barrier.

35. The method of claim 34 further including the step of:
introducing a fluent elastomer into said thermoplastic sheaths for blocking potential leakage paths within said thermoplastic sheaths.

36. A method for terminating a multi-conductor electrical cable having a plurality of conductors respectively enclosed within thermoplastic insulating sheaths and collectively arranged within a common cable covering with their end portions protruding forwardly therefrom and comprising the steps of:

passing said protruding end portions through corresponding snugly-fitting openings respectively located in forward and rearward spacers constructed of a thermally-stable plastic and cooperatively arranged for laterally separating said conductor end portions spanned between the opposed faces of said spacers and at the same time also passing said conductor end portions through corresponding openings which are aligned with said snugly-fitting openings and located in a disc-like laminated member having a thermosetting-polymer layer positioned against the rearward face of said forward spacer and a thermoplastic layer bonded on the rearward face of said polymer layer;

positioning a first hollow mold around said spacers for defining a first enclosed cavity surrounding all of said laterally-separated conductor end portions and said laminated member;

injecting a molten thermoplastic into said first cavity at a temperature no lower than the fusion temperatures of said thermoplastics for molding a unitary fluid barrier having said polymer layer bonded on its forward face and which is integrally fused around each of said insulating sheaths to block potential leakage paths through said fluid barrier and exterior of said insulating sheaths;

positioning a second hollow mold around each of said spacers for defining a second enclosed annular cavity around the perimeter of said fluid barrier;

injecting an unvulcanized mass of a selected elastomer having a chemical affinity for said thermoplastics into said second cavity and heating said unvulcanized mass to an elevated temperature sufficient to effect an integral bond therewith and vulcanize said elastomer for molding a unitary elastomeric band bonded around the perimeter of said fluid barrier;

arranging a multi-terminal electrical connector having an insulated member supporting each of the terminals thereof on said conductor end portions ahead of said fluid barrier;

positioning a third hollow mold around said fluid barrier and said electrical connector for defining a third enclosed cavity around at least a portion of said elastomeric band and said insulated terminal-supporting member; and injecting a moldable polymer having a chemical affinity for said elastomeric band and said polymer layer into said third cavity for forming and sealingly bonding a polymer layer into said third cavity for forming and sealingly bonding a polymer body around and to said elastomeric band and at least those surfaces of said polymer layer and of said terminal-supporting member respectively encircling each of said conductor end portions to block potential fluid leakage paths within said polymer body which are exterior of said fluid barrier and would otherwise intercommunicate the interiors of two or more of said insulating sheaths.

37. The method of claim 36 further including the step of:

bonding said polymer body around and to said cable covering for protecting said end portions between said cable covering and the rearward face of said fluid barrier.

38. The method of claim 36 further including the step of:

introducing a fluent elastomer into said thermoplastic sheaths for blocking potential leakage paths within said thermoplastic sheaths.

39. The method of claim 38 wherein said third cavity is also defined around the end portion of said cable covering so that upon injection of said moldable polymer into said third cavity, said unitary polymer body will also be formed around and bonded to said end portion of said cable covering for protecting said conductor end portions between said cable covering and the rearward face of said fluid barrier.

40. The method of claim 36 wherein said thermoplastics are respectively selected from the group consisting of ethylene-propylene copolymers, polyethylenes, and polyvinyl chlorides.

41. The method of claim 36 wherein said polymers are respectively selected from the group consisting of chloroprenes, chlorosulfonated polyethylenes, epoxies, ethylene-propylene-diene monomers, nitriles, and polyurethanes.

42. The method of claim 36 wherein said electrical connector includes a tubular shell carrying said insulated terminal-supporting member enclosing at least a portion of said polymer body and further including the step of:

sealingly bonding another polymer body around exterior portions of said tubular shell and of said elastomeric band for blocking additional potential leakage paths within said other polymer body exterior of said fluid barrier and of said thermoplastic sheaths.

43. The method of claim 42 further including the step of:

bonding said other polymer body around and to said cable covering for protecting said end portions between said cable covering and the rearward face of said fluid barrier 44. A cable assembly comprising:

a multi-conductor electrical cable including a protective covering around a plurality of electrical conductors respectively enclosed within thermoplastic sheaths with end portions protruding from said covering;

connector means including a plurality of electrical terminals respectively arranged on said conductor end portions;

a thermoplastic fluid barrier molded around and laterally separating each of said conductor end portions between said cable covering and said electrical terminals and integrally fused around each of said thermoplastic sheaths respectively for blocking off potential leakage paths through said fluid barrier and exterior of said thermoplastic sheaths; and a polymer body integrally molded around and sealingly bonded to at least those surfaces on the forward face of said fluid barrier respectively encircling each of said conductor end portions passing therethrough as well as around each of said electrical terminals for blocking potential leakage paths within said polymer body which are ahead of said fluid barrier and would otherwise intercommunicate the interiors of two or more of said thermoplastic sheaths.

45. The cable assembly of claim 44 wherein said polymer body is also integrally molded around said cable covering for enclosing said conductor end portions between said cable covering and said fluid barrier.

46. The cable assembly of claim 44 wherein said thermoplastics are selected from the group consisting of ethylene-propylene copolymers, polyethylenes, and polyvinyl chlorides.

47. The cable assembly of claim 44 wherein said polymer body is molded from a polymer selected from the group consisting of chloroprenes, chlorosulfonated polyethylenes, ethylene-propylene-diene monomers, ethylene-propylene rubbers, nitriles, and polyurethanes.

48. The cable assembly of claim 44 wherein said thermoplastics are an ethylene-propylene copolymer, and said polymer body is of a chloroprene.

49. The cable assembly of claim 44 wherein said thermoplastics are polyethylene, and said polymer body is of a polyurethane.

50. The cable assembly of claim 44 wherein said thermoplastics are an ethylene-propylene copolymer, and said polymer body is of a polyurethane.

51. A cable assembly comprising:
an electrical cable including a plurality of electrical conductors respectively encased in thermoplastic sheaths and collectively enclosed within protective covering with end portions of said conductors projecting therefrom;
connector means including a contact-support member of an electrically non-conductive material and a plurality of electrical contacts respectively connected to said electrical conductors and cooperatively arranged at spaced intervals on said contact-support member;
a unitary liquid-impervious fluid barrier of thermoplastic molded around and laterally separating each of said conductor end portions between said cable covering and said contact-support member and integrally fused around each of said thermoplastic sheaths for blocking potential leakage paths exterior thereof wthin said fluid barrier;
elastomer surfacing means integrally bonded to at least the forward face of said fluid barrier and around each of said thermoplastic sheaths projecting therebeyond; and
a polymer body integrally molded around each of said conductor end portions spanned between said fluid barrier and said connector means with said polymer body being sealingly bonded to said elastomer surfacing means and to said contact-support member respectively for blocking potential leakage paths within said polymer body ahead of said fluid barrier and otherwise intercommunicating the interiors of two or more of said thermoplastic sheaths.

52. The cable assembly of claim 51 wherein said polymer body is also integrally molded around said cable covering for enclosing said conductor end portions between said cable covering and said fluid barrier.

53. The cable assembly of claim 51 wherein said thermoplastics are selected from the group consisting of ethylene-propylene copolymers, polyethylenes, and polyvinyl chlorides.

54. The cable assembly of claim 51 wherein said polymer body is molded from a polymer selected from the group consisting of chloroprenes, chlorosulfonated polyethylenes, ethylene-propylene-diene monomers, ethylene-propylene rubbers, nitriles, and polyurethanes.

55. The cable assembly of claim 51 wherein sad elastomer surfacing means includes an elastomer selected from the group consisting of ethylene-propylene-diene monomers, chloroprenes, and ethylene-propylene rubbers.

56. The cable assembly of claim 51 wherein said elastomer surfacing means are also integrally bonded around the perimeter of said fluid barrier; and said polymer body is integrally bonded to said elastomer surfacing means around the perimeter of said fluid barrier and integrally molded around said cable covering for enclosng said conductor end portions between said cable covering and said fluid barrier.

57. The cable assembly of claim 51 wherein said elastomer surfacing means include a thermoplastic layer integrally fused into said fluid barrier and an elastomer layer bonded to said thermoplastic layer and thereby to said forward face of said fluid barrier.

58. The cable assembly of claim 57 wherein said thermoplastic layer is formed of the same thermoplastic material as that used for forming said fluid barrier and said sheaths.

59. The cable assembly of claim 51 wherein said elastomer surfacing means include a first elastomer layer sealingly bonded to said forward face of said fluid barrier and said polymer body and a second elastomer layer sealingly bonded around the perimeter of said fluid barrier and to said polymer body.

60. The cable assembly of claim 59 wherein said polymer body is also integrally molded around said cable covering for enclosing said conductor end portions between said cable covering and said fluid barrier.

61. A cable assembly comprising:
an electrical cable including a plurality of electrical conductors respectively encased in thermoplastic sheaths and collectively enclosed within a protective covering with end portions of said conductors projecting therefrom;
connector means including a tubular shell, a contact-support member of a electrically non-conductive material cooperatively mounted within said tubular shell, and a plurality of electrical contacts respectively connected to said electrical conductors and cooperatively arranged at spaced intervals on said contact-support member;
a unitary liquid-impervious fluid barrier of thermoplastic molded around and laterally separating each of said conductor end portions between said cable covering and said contact-support member and integrally fused around each of said thermoplstic sheaths for blocking potential leakage paths exterior thereof within said fluid barrier;
elastomer surfacing means integrally bonded to at least the forward face of said fluid barrier and around each of said thermoplastic sheaths projecting therebeyond;
a first polymer body integrally molded around each of said conductor end portions spanned between said fluid barrier and said connector means with said first polymer body being within said tubular shell and sealingly bonded to sid elastomer surfacing means and to said contact-support member respectively for blocking potential leakage paths within said first polymer body ahead of said fluid barrier and otherwise intercommunicating the interiors of two or more of said thermoplastic sheaths; and a second polymer body having its mid-portion integrally molded around said fluid barrier and one end integrally molded around said cable covering for enclosing said conductor end portions between said cable covering and said fluid barrier and its other end integrally molded around said tubular shell.

62. The cable assembly of claim 61 wherein said thermoplastics are selected from the group consisting of ethylene-propylene copolymers, polyethylenes, and polyvinyl chlorides.

63. The cable assembly of claim 61 wherein said polymer bodies are respectively molded from polymers selected from the group consisting of chloroprenes, chlorosulfonated polyethylenes, ethylene-diene monomers, ethylene-propylene rubbers, nitriles, and polyurethanes.

64. The cable assembly of claim 61 wherein said elastomer surfacing means includes a elastomer selected from the group consisting of ethylene-propylene-diene monomers, chloroprenes and ethylene-propylene rubbers.

65. The cable assembly of claim 61 wherein said elastomer surfacing means are also integrally bonded around the perimeter of said fluid barrier; and said second polymer body is integrally bonded to said elastomer surfacing means around the perimeter of said fluid barrier.

66. The cable assembly of claim 61 wherein said elastomer surfacing means include a thermoplastic layer integrally fused into said fluid barrier and an elastomer layer bonded to said thermoplastic layer and thereby to said forward face of said fluid barrier.

67. The cable assembly of claim 66 wherein said thermoplastic layer is formed of the same thermoplastic material as that used for forming said fluid barrier and said sheaths.

68. The cable assembly of claim 61 wherein said elastomer surfacing means include a first elastomer layer sealingly bonded to said forward face of said fluid barrier and said first polymer body and a second elastomer layer sealingly bonded around the perimeter of said fluid barrier and to said second polymer body.

* * * * *